2,754,272

REGENERATION OF SILICA-MAGNESIA
CRACKING CATALYSTS

Robert A. Van Nordstrand, Flossmoor, Ill., assignor to Sinclair Refining Company, New York, N. Y., a corporation of Maine No Drawing. Application June 13, 1950,
Serial No. 167,909

1 Claim. (Cl. 252—416)

My invention relates to improvements in the regeneration of silica-magnesia catalysts which are employed in the cracking of hydrocarbon oils. In catalytic cracking processes, the oil charge is contacted at elevated temperature with an adsorptive solid catalyst of relatively high surface area having cracking activity. In the course of the cracking reaction, the adsorptive surfaces of the catalyst become fouled with coke or carbonaceous matter produced as a consequence of the hydrocarbon conversion reaction. The catalyst is regenerated by combustion of the adsorbed carbonaceous matter with an oxygen containing regeneration gas and then is re-employed in the conversion reaction.

The oil charge and the catalyst may be handled according to a number of systems, by fixed bed contacting, moving bed contacting, or in suspension systems including the so-called fluid method of handling the catalyst. The form of the catalyst is adapted to its method of handling. Thus the catalyst may be in bead, granular or pelleted form for fixed or moving bed methods or may be in finely divided form for the fluid method. The conventionally employed catalysts are naturally occurring clays which have been activated by acid treatment and certain synthetic silica-alumina gel type catalysts. A newer catalyst is silica magnesia which has much higher cracking activity in terms of total conversion and more desirable product distribution in terms of gasoline yield. Silica-magnesia cracking catalyst, however, presents a difficult regeneration problem in conventional systems, for it is characterized by an inherently slower carbon burning rate. Thus for the same carbon level on the spent catalyst, considerably higher regeneration temperatures or considerably higher quantities of regeneration air, or both are required to reduce the carbon on silica-magnesia catalyst to the same level as with clay type or silica-alumina type catalysts. Both temperature and air quantity, however, are limiting quantities in the operation of a catalytic cracking unit. Temperature is limited because high temperature deactivates the catalyst by sintering and reducing the surface area of the catalyst. I have found that this is particularly critical with silica-magnesia cracking catalysts. Air quantity is limited because of the inflexibility in the design of blowers, because of the high cost of blower equipment, and because of the necessity of keeping gas velocities through the regenerator below a velocity which will increase fines carry-over to an economically disadvantageous level.

I have now discovered that the specific carbon burning rate of silica-magnesia cracking catalysts can be approximately doubled by providing about 3 to 5 p. s. i. a. partial pressure of steam within the regenerator. For example, the specific carbon burning rate of a typical silica-magnesia cracking catalyst in terms of pounds of carbon burned per ton of catalyst per hour per pound partial pressure of oxygen may be increased from 21 to 43 by means of 3 p. s. i. a. steam partial pressure. I have found that the resulting increase in carbon burning capacity for the regenerator is a net gain to the cracking process because the use of steam in the regeneration of silica-magnesia cracking catalysts does not deactivate the catalyst. Indeed, the equilibrium activity of the circulating catalyst appears to be benefited because the normally low sintering temperature; i. e. 1400° F., of silica-magnesia catalyst appears to be elevated by the presence of steam. This is surprising because it is well known that steam seriously deactivates clay type catalysts and silica-alumina catalysts.

I also have found that silica-magnesia cracking catalysts respond to the presence of steam in regeneration quite differently than clay type or silica-alumina catalysts in another important consideration. The carbon burning rate of the clay type and the silica-alumina catalysts is improved by the presence of steam in regeneration, but the efficiency of oxygen consumption is seriously affected because the ratio of carbon dioxide to carbon monoxide in the flue gas is increased by nearly the same factor as the increase in specific carbon burning rate. By contrast, the $CO_2/CO$ ratio with silica-magnesia cracking catalysts is substantially uneffected by the presence of steam in regeneration and indeed is sometimes slightly reduced. The result is effective maintenance of oxygen efficiency without increase in regeneration temperature. For as is well known the combustion of carbon to produce carbon monoxide is much less exothermic than the production of carbon to produce carbon dioxide. Only 26 kilogram-calories per mole of carbon consumed are produced in the first case as against 94 kilogram-calories per mole of carbon consumed in the second case.

According to my invention, regeneration of silica-magnesia cracking catalyst is improved by providing a steam partial pressure in the regeneration zone of about 3 to 7 p. s. i. a. based upon a total absolute pressure within the regeneration zone of 1 atmosphere. The steam may be introduced in admixture with the regeneration gas or it may be separately introduced to the regenerator or to the stream of spent catalyst charged to the regenerator. In a conventional fluid unit, the steam is introduced with the main portion of regeneration gas which picks up spent catalyst discharging from the spent catalyst stripper of the reactor side of the unit, carrying it into the regenerator in suspension through the regenerator riser pipe. The steam, however, may be introduced in increments with the regeneration gas, that is, a part with the primary carrier air, a part directly into the regenerator bed, and a part admixed with the carrier air used in the recycle cooling system. In moving bed or fixed bed systems, it is advantageous to proportion the steam supply with the regeneration gas so as to obtain the desired steam partial pressure during the regeneration reaction.

The conditions of the steam employed are not critical and indeed it is desirable to take advantage of the cooling effect of low pressure steam as an aid in controlling regenerator temperature. Thus with finely divided catalyst where spalling or fracturing is not a significant problem it is possible to employ water sprays to provide the desired steam partial pressure within the regeneration zone. Also where hot spots or after burning problems are encountered, it is often advantageous to introduce the steam at such points.

I have found that there appears to be a linear relationship between specific burning rate and steam partial pressure in the regeneration zone up to 7 to 8 p. s. i. a. With less than about 3 p. s. i. a. steam partial pressure, improvement in burning rate is usually too insubstantial for commercial advantage. Above about 7 to 8 p. s. i. a. steam partial pressure, the burning time and the actual burning rate in terms of pounds of carbon burned per hour are not improved. There tends to be a reduction in effective partial pressure of oxygen at steam partial pressures above this level, and the oxygen efficiency suffers due to a tendency for increase in the $CO_2/CO$ ratio in the flue gas.

I am unable to explain the mechanism which accounts for the improvement in specific burning rate by provision of steam partial pressure in the regeneration zone. The effect of steam is not additive since steam alone removes only a relatively small amount of carbon. By X-ray diffraction studies, I have determined that there is a reversible hydration-dehydration transition which occurs with silica-magnesia cracking catalysts in the range of 500° to 600° C. The dehydration transition is endothermic and appears to involve transition from the quasi-crystalline phase of the high area, high activity virgin catalyst to an amorphous phase which however retains relatively high area and and high activity. Chemically, there appears to be a loss of 1 molecule of water from $MgSiO_2(OH)_2$ to $MgSiO_3$. My studies further have shown that the reaction appears to change the pore dimensions of the catalyst. Dehydration of the magnesia results in an expansion of the pore spaces, amounting to approximately 6 A. units. In conventional processing, dehydration occurs in the course of the regeneration cycle, and the reaction cycle is carried out employing the substantially dehydrated catalyst under conditions that maintain the state of dehydration. Thus the accessibility of the catalyst is good and the carbon is deposited to a large extent in the internal pores of the catalyst. Then in conventional processing, the spent catalyst is stripped with steam which rehydrates the catalyst effecting a contraction of the pore spaces so that there is a tendency to seal the carbon within the catalyst. The carbon within the constricted pores is less accessible for burning and in effect the burning rate of the catalyst may be seriously affected. The carbon may remain sealed off through subsequent cycles or may be stabilized by the high temperature encountered in regeneration so that in subsequent cycles even though accessible it is less burnable.

This may be a partial explanation of the capacity of steam for improving regeneration according to my invention. It cannot be the entire explanation however because I have determined that there is no significant change in volatile matter between catalyst after steam runs and runs without steam. The total effect appears therefore to involve a catalytic effect of the steam, or possibly a different reaction than simple combustion in the regeneration zone which involves both steam and oxygen.

As indicated above, I also have found in my X-ray diffraction studies with silica-magnesia catalysts that these catalysts are highly susceptible to loss of area and activity through sintering. At about 700° to 800° C., an irreversible transition from the amorphous phase of the dehydrated silica-magnesia catalyst to crystalline enstatite, $MgSiO_3$, occurs. The transition is exothermic and therefore is not reversible with steam or water. The crystalline form has very low area and vitrually no activity. Thus where a sample of virgin Davison DA-5 silica-magnesia cracking catalyst in a representative batch has an activity of 58 D+L and an area of 650 square meters per gram, a pilot plant sample of the same catalyst where after burning was suspected in the regenerator showed an activity of only 7 D+L and an area of 23 square meters per gram, with almost complete transition to enstatite. The provision of a steam partial pressure within the regenerator according to my invention tends to elevate this irreversible transition temperature, by accomplishing substantial rehydration of the catalyst.

The principles of my invention will be further illustrated by reference to the following burning tests conducted on silica-magnesia cracking catalyst. The effect is most conveniently shown on a laboratory scale but correlation with commercial burning data appears to be good.

The catalysts employed are typical silica-magnesia cracking catalysts available commercially or semi-commercially and as identified are well-known in the art. In general, they analyze about 25–30 per cent MgO with the balance silica after drying and calcining for several hours at 1000°–1350° F.

In the burning tests, a heated water saturator is provided, with a thermal well and means for by-passing it. A second insulated well with a condensate drain is placed between the saturator and the reactor inlet. A quartz or Pyrex reaction flask is utilized, and the three pieces are placed as close together as possible. The regeneration gas stream consisting of 2 per cent oxygen in nitrogen is passed through the saturator and into the reactor where it fluidizes the catalyst sample. The temperature of the gas stream where it enters the reactor where some condensation is taking place, is used as a dew-point measurement, and is converted to steam partial pressure. The difference between the dew point and the saturator temperature is usually 4° to 8° C. The reactor effluent gas is passed over a Dry Ice cold-finger and then through a large drying tower packed with Drierite, with Dehydrite at the exit. The water collected is compared with the quantity calculated from the dew point and an average deviation of about 10 per cent is observed. A train of 4 Ascarite tubes divided by a carbon monoxide oxidizer is employed to determine the quantities of carbon dioxide and carbon monoxide in the flue gas.

The test procedure is as follows: the carbonized catalyst is dropped in with nitrogen flowing, is purged for about 30 minutes dry; if steam is to be used, the nitrogen is passed through the saturator for 4 minutes prior to combustion; the weighed ascarite tubes are put in the train, and 2 per cent oxygen passed through for a measured length of time, the pressure being measured, followed by a 4-minute nitrogen purge; the ascarite tubes are removed and weighed; catalyst is removed by sucking out in a nitrogen atmosphere, cooled, weighed, and per cent carbon is determined. The 4-minute wet purge is necessary to get a constant steam pressure before start of combustion. Longer times are avoided since it has been found that steam plus nitrogen tends to remove a little carbon; equivalent burning rates run in the absence of oxygen vary from 5 to 9 pounds carbon burned per ton of catalyst per hour at steam pressures at which the true rates vary from 31 to 43 pounds carbon burned per ton of catalyst per hour per p. s. i. a. $O_2$. In spite of this, comparisons of 4 minutes with longer wet purge times fail to show any difference in burning rate, but some difference in carbon level.

Representative test data follow:

| Example Identity | Initial Percent Carbon [1] | | Final [2] Percent Carbon | Steam | | $CO_2/CO$ | SBR at 0.3% Carbon,[3] lbs./ton/hr./p. s. i. a. |
| --- | --- | --- | --- | --- | --- | --- | --- |
| | obs. | Calc.[2] | | Mol Percent | p. s. i. a. | | |
| Si-Mg microspheres (Nalco) | 0.40 | 0.40 | 0.33 | 0 | 0 | 1.6 | 19 |
| Do | 0.40 | 0.40 | 0.31 | 14 | 3.0 | 1.6 | 43 |
| Used Si-Mg microspheres (Nalco) | 0.26 | 0.25 | 0.19 | 0 | 0 | 1.6 | 22 |
| Do | 0.26 | 0.24 | 0.16 | 15 | 3.2 | 2.0 | 52.5 |
| Si-Mg microspheres (Am. Cyanamid) | 0.40 | 0.40 | 0.35 | 0 | 0 | 0.8 | 11 |
| Do | 0.40 | 0.40 | 0.33 | 9 | 1.6 | 1.0 | 22 |
| Do | 0.40 | 0.38 | 0.31 | 13 | 2.5 | 0.9 | 28 |
| Do | 0.40 | 0.37 | 0.32 | 32 | 6.0 | 0.9 | 37 |
| Used Si-Al-Mg microspheres (Am. Cyanamid) | 0.46 | 0.45 | 0.38 | 0 | 0 | 1.4 | 14 |
| Do | 0.46 | 0.47 | 0.39 | 14 | 3.2 | 1.6 | 23.5 |
| Si-Mg pulverized (Davison) | 0.44 | 0.42 | 0.34 | 0 | 0 | 1.3 | 16.5 |
| Do | 0.44 | 0.42 | 0.32 | 19 | 3.8 | 1.5 | 37.5 |
| Used Si-Mg pulverized (Davison) | 0.43 | 0.45 | 0.40 | 0 | 0 | 1.2 | 10 |
| Do | 0.43 | 0.39 | 0.31 | 18 | 3.7 | 1.5 | 27 |

[1] Gas-oil carbon.
[2] Calculated from final percent carbon + weight of carbon burned (ascarite).
[3] Corrected to 0.3% carbon by assuming first order reaction.

I claim:

In the regeneration of silica-magnesia cracking catalysts by combustion of adherent carbonaceous matter with an oxygen containing regeneration gas, the step of providing a steam partial pressure of about 3 to 7 p. s. i. a. in the regeneration zone based upon a total regeneration pressure of 1 atmosphere absolute pressure.

References Cited in the file of this patent

UNITED STATES PATENTS

| | | |
| --- | --- | --- |
| 2,284,603 | Belchetz et al. | May 26, 1942 |
| 2,326,705 | Thiele et al. | Aug. 10, 1943 |
| 2,390,556 | Ruthruff | Dec. 11, 1945 |
| 2,420,534 | Gohr et al. | May 13, 1947 |
| 2,430,249 | Ruthruff | Nov. 4, 1947 |
| 2,605,237 | Webb | July 29, 1952 |

FOREIGN PATENTS

| | | |
| --- | --- | --- |
| 664,897 | Great Britain | Jan. 16, 1952 |
| 678,059 | Great Britain | Aug. 27, 1952 |